United States Patent
Bajusz et al.

(10) Patent No.: US 8,899,917 B2
(45) Date of Patent: Dec. 2, 2014

(54) GAS FLOW SEPARATOR WITH A THERMAL BRIDGE DE-ICER

(75) Inventors: Denis Bajusz, Remicourt (BE); Nicholas Raimarckers, Tourinne (BE); Antoine Stephany, Sprimont (BE); Georges Broers, Hoeselt (BE); Yves Culot, Liege (BE); Marc Strengnart, Fize-le-Marsal (BE); Albert Cornet, Verviers (BE); David Depaepe, Liege (BE)

(73) Assignee: Techspace Aero S.A. (BE)

( * ) Notice: Subject to any disclaimer, the term of this patent is extended or adjusted under 35 U.S.C. 154(b) by 501 days.

(21) Appl. No.: 13/429,627

(22) Filed: Mar. 26, 2012

(65) Prior Publication Data
US 2012/0251373 A1 Oct. 4, 2012

(30) Foreign Application Priority Data

Mar. 30, 2011 (EP) .................................... 11160524

(51) Int. Cl.
F01D 25/02 (2006.01)
F02C 7/047 (2006.01)

(52) U.S. Cl.
CPC ................ F02C 7/047 (2013.01); F01D 25/02 (2013.01); F05D 2260/20 (2013.01); Y02T 50/676 (2013.01)
USPC ......... 415/144; 415/177; 415/220; 60/39.093

(58) Field of Classification Search
CPC ...................................... F01D 25/02
USPC ...................... 60/39.093; 415/144, 220, 177; 244/134 R
See application file for complete search history.

(56) References Cited

U.S. PATENT DOCUMENTS

| 5,281,091 | A | * | 1/1994 | Dooley et al. ................. 415/178 |
| 6,725,645 | B1 | * | 4/2004 | Wadia et al. ................. 60/226.1 |
| 6,990,797 | B2 | * | 1/2006 | Venkataramani et al. ...... 60/204 |
| 8,192,148 | B2 | * | 6/2012 | Guemmer ..................... 415/145 |
| 2003/0035719 | A1 | | 2/2003 | Wadia et al. |

FOREIGN PATENT DOCUMENTS

| EP | 1046784 A1 | 10/2000 |
| EP | 1895141 A2 | 3/2008 |
| EP | 2075194 A1 | 7/2009 |
| GB | 2406142 A | 3/2005 |
| WO | 2010/086560 A2 | 8/2010 |

* cited by examiner

*Primary Examiner* — Ninh H Nguyen
(74) *Attorney, Agent, or Firm* — Polster Lieder

(57) ABSTRACT

The invention relates to a gas flow separator dividing the flow into a primary and a secondary stream, especially for a dual rotor axial turbomachine. The separator comprises a splitter nose of the turbomachine and includes a generally wedge-shaped leading edge in the gas flow to be split. The flow separator also comprises a metal blade having a longitudinal section in the form of an "S" and located in the nose in contact with the back of the leading edge and extending from the leading edge to a rear end of the separator at some distance from the leading edge, so as to be in contact with a heat source, such as a heat exchanger, located at some distance from the leading edge.

16 Claims, 4 Drawing Sheets

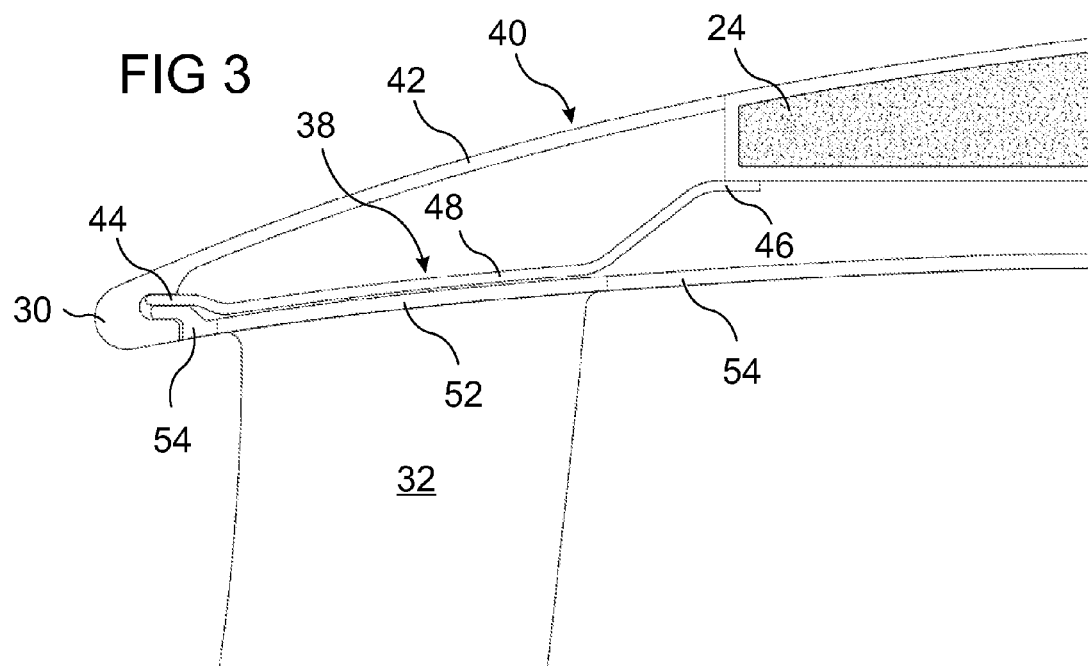
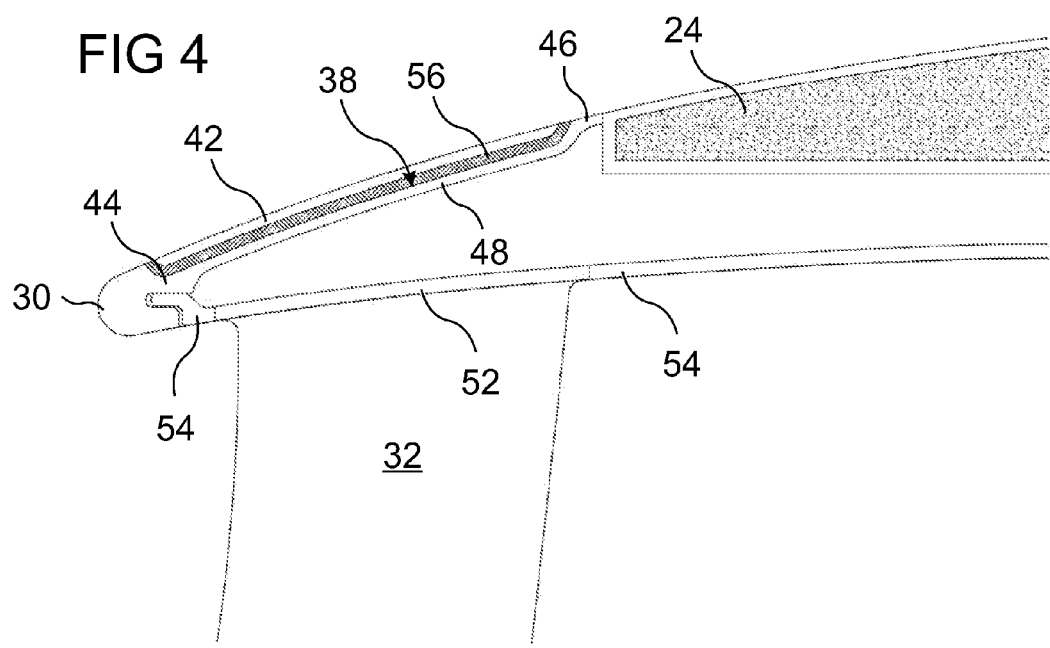

under a certain thermal stress and may dilate in operation. For these reasons, the blade is preferably composed of a material that contracts under the effect of heat in relation to the main material of the de-icing device, which is generally titanium or a titanium alloy.

GAS FLOW SEPARATOR WITH A THERMAL BRIDGE DE-ICER

CROSS-REFERENCE TO RELATED APPLICATIONS

This application claims the benefit, under 35 U.S.C. §119, of European Application No. EP 11160524.2, which was filed on Mar. 30, 2011, the content of which is incorporated here by reference in its entirety.

FIELD

The present teachings relate to a system for preventing ice accretion on the surfaces of machines or devices that separate flows of gases.

BACKGROUND

The statements in this section merely provide background information related to the present disclosure and may not constitute prior art.

Ice accretion on the surfaces of machines or devices that separate flows of gases, such as air, into a primary and a secondary flow, e.g., surfaces of a turbomachine, can cause mechanical and safety issues regarding the respective machine or device. For example, this type of separator is found especially in the inlet compressor of a dual rotor axial turbomachine. In this type of machine, the flow of incoming air is separated into a primary and a secondary flow. The primary flow, generally annular in cross-section, passes through the engine's different compression stages, the combustion chamber and turbine. The secondary flow, generally annular in cross-section and of a greater diameter than the primary flow and concentric with the primary flow, is compressed by the fan and the secondary flow stators and then rejoins the main flow, contributing to the thrust.

The secondary flow separated from the main airflow after passing through the inlet fan can cause the leading edges of the secondary airstream guide surfaces to ice up. This airstream is not subject to any heating and its defining boundary walls are relatively far from the machine's heat sources. In certain conditions (cold air having a high humidity) the air may contain supercooled water droplets which solidify on contact with the leading edges, the latter then providing accretion surfaces where icing can occur. This phenomenon is particularly common at the primary and secondary stream splitter nose, specifically at the leading edge and the boundary wall defining the secondary flow close to the leading edge.

United States patent application US/2003/0035719 A1 discusses the problem of icing on the leading edge of the splitter nose. The proposed solution in US/2003/0035719 is to provide clearance at the mechanical joint between the leading edge and the wall defining the primary stream, and to inject a stream of hot air in the cavity formed by the splitter nose. Because of this clearance, the hot air can flow along the mechanical joint at the leading edge and escape. This flow ensures a supply of thermal energy close to the leading edge. An alternative described in US/2003/0035719 is to provide an additional wall in the secondary airflow. The nose is designed so that the flow of hot air also escapes onto the additional wall. The flow of hot air comes from the high pressure compressor. The solution proposed by this interpretation has two major drawbacks, namely the complexity of the hot air feeder device and the loss of power due to this leakage flow (energy required to compress the airflow does not contribute to the thrust).

Patent GB 2,406,142 A also addresses the problem of icing on the leading edge and the first row of stator blades. The proposed solution in GB 2,406,142 is to provide a heat pipe connecting a heat source located further downstream in the machine with the splitter nose. Although the effective thermal conductivity of a heat pipe is high, especially in comparison with a material such as copper, this solution is nevertheless expensive and complicated because a number of heat pipes distributed over the circumference of the splitter nose are necessary to ensure effective de-icing.

Patent EP 2075194 A1 relates to an air-oil heat exchanger located at the splitter nose and close to the leading edge. The presence of the heat exchanger near the leading edge has the double advantage of forming a heat source to prevent icing as well as providing high efficiency heat exchange. However, it has drawbacks as it is technically complex. This solution also presents a significant risk of damage to the exchanger and oil leakages when the machine ingests a foreign body, because of the very forward position of the exchanger.

Patent EP 1895 141 A2 also relates to an air-oil heat exchanger located at the splitter nose and close to the leading edge. The most forward part of the splitter nose together with the walls of the nose forms an internal volume covered by a lubricant for cooling. This configuration prevents ice forming because of the heat supplied by the lubricant. As in EP 2075194 A, this arrangement is technically complex and likely to suffer from failures, especially leakage of the lubricant when the machine ingests a foreign body.

SUMMARY

The present disclosure provides a solution to at least one of the problems mentioned above, more particularly the present disclosure provides a simple, economical and reliable solution to the problem of icing at the forward (or upstream) end of the gas stream separator.

The invention consists of a de-icing device for separating a gas flow into a primary and a secondary stream, comprising: a leading edge to separate the gas stream and having an approximately wedge-shaped longitudinal section so as to separate the gas stream into a primary and a secondary stream, and a leading edge de-icing device. The de-icing device additionally comprises a metal blade in contact with the back of the leading edge and extending from the leading edge to a rear end of the separator at some distance from the leading edge, so as to be in contact with a heat source placed at some distance from the leading edge.

This solution is particularly advantageous because it ensures a thermal bridge between that part of the separator that is most prone to icing and a heat source set behind this area, especially where the separator is thicker and can also advantageously accommodate a heat source. Thermal bridging is achieved very simply and efficiently. The separator assembly is simple and is unlikely to cause failures in the event of any impact with foreign bodies.

According to an advantageous embodiment of the invention, the contact between the metal blade and the leading edge is provided by insertion of the blade in a slot at the rear of the leading edge. This makes installation very simple. In addition, this arrangement ensures satisfactory heat conduction.

According to another advantageous embodiment of the invention, the separator comprises a guide wall between the primary and secondary flows, and the metal blade is in contact with the guide wall. The blade's twin contacts ensure a thermal connection with the wall, ensuring heat input not only at the leading edge but also at the wall. The wall is preferably in direct contact with the leading edge. The wall is preferably made in one piece with the leading edge or integral with it. The wall may well be formed of stator blade carriers.

Preferably the blade may have one or more connections in the form of feet, especially between its central part and parts of the nose, such as the guide wall or the carriers of the first row of stator blades. If the aim is to direct heat to several points on the shell, it is possible to provide one or more connections from the front end or the central part of the blade towards these points.

According to yet another advantageous embodiment of the invention, the metal blade is held in place by fixing its rear end to the guide wall. This has the additional advantage that the thermal connection between the blade and the wall is provided directly by its mechanical connection.

According to yet another advantageous embodiment of the invention, the metal blade extends mainly along the guide wall, preferably with an insulating material placed between the guide wall and the metal blade. The separator may be a flow separator between the primary and secondary flow of an axial turbomachine. In this case, the guide wall may well direct the primary flow and be made up of fixing platforms for the stator blades. The blade can then extend mainly along these platforms, preferably with contact, to ensure de-icing of the blades.

According to yet another advantageous embodiment of the invention, the metal blade is of a single piece with the leading edge and the guide wall fixed to the blade by the insulating material. This embodiment is particularly advantageous when the separator is a flow separator between the primary and secondary flows of an axial turbomachine. More particularly, the guide wall can, in particular, direct the secondary flow and be supported by the blade.

According to yet another advantageous embodiment of the invention, the metal blade has a longitudinal section in the form of an "S", preferably with rectilinear front and back faces. The "S" shape compensates for differential thermal expansion between the blade and the separator.

According to yet another advantageous embodiment of the invention, the separator comprises a splitter nose for dividing the gas flow in a dual rotor axial turbomachine, the first flow being the primary flow and the second flow being the secondary flow of the said dual rotor turbomachine.

According to yet another advantageous embodiment of the invention, the splitter nose includes a guide wall for the secondary flow, and the metal blade is in contact with a rear end of the said wall. The guide wall is preferably in direct contact with the leading edge. The wall is preferably made in one piece with the leading edge or integral with it.

According to yet another advantageous embodiment of the invention, the separator comprises a surface heat exchanger in the extension of the guide wall in the secondary flow, and the metal blade is in contact with the said exchanger. The use of a heat exchanger located adjacent to the guide wall and used as a heat source is particularly advantageous both in terms of simplicity of construction as well as reliability. In any event it also helps to make good use of the heat to be removed.

According to yet another advantageous embodiment of the invention, the guide wall, the heat exchanger and the metal blade form a stacked assembly. This means that fitting is simple and fast.

According to yet another advantageous embodiment of the invention, the metal blade includes at least one female thread for mating with a bolt passing through the superimposed assembly, thereby further simplifying fitting.

According to yet another advantageous embodiment of the invention, the metal blade has an approximately circular cross-section.

According to yet another advantageous embodiment of the invention, the de-icing device comprises a plurality of blades each having an approximately arcuate cross-section.

The invention can also consist of a dual rotor axial turbomachine comprising an airflow separator, separating the primary and secondary streams, the separator being in accordance with the separator described above.

According to an advantageous embodiment of the invention, the metal blade is in contact with a heat source located at some distance from the leading edge.

The invention can further consist of a dual rotor axial turbomachine comprising a low-pressure compressor in accordance with that described above.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 3 is a sectional view of a first embodiment of the flow separator of FIG. 2, in accordance with the invention.

FIG. 4 is a sectional view of a second embodiment of the flow separator of FIG. 2, in accordance with the invention.

Corresponding reference numerals indicate corresponding parts throughout the several views of drawings.

DETAILED DESCRIPTION

Figure 1:
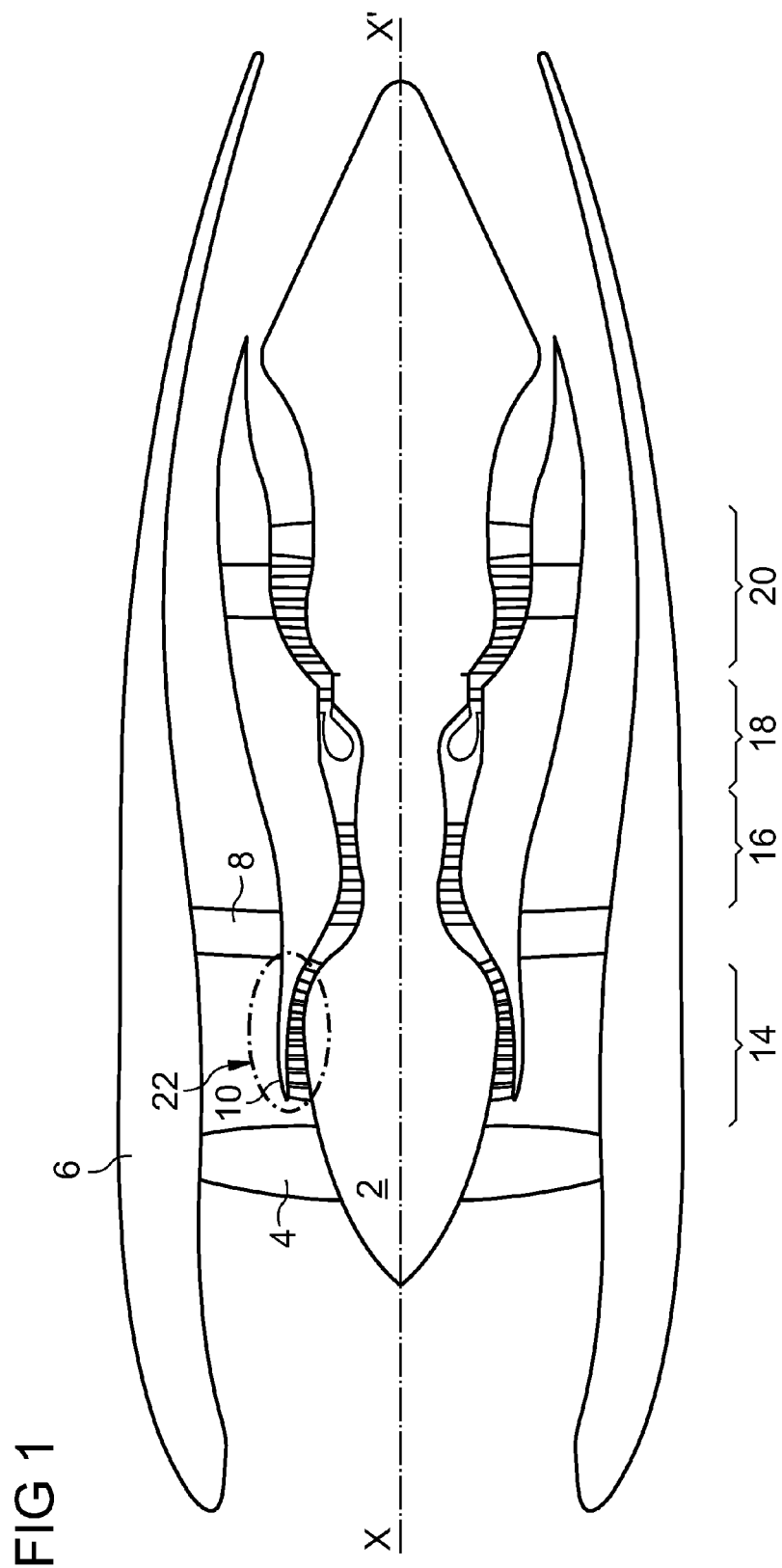
FIG. 1 is a general sectional view of a jet engine showing the location of a splitter nose according to the invention.

The following description is merely exemplary in nature and is in no way intended to limit the present teachings, application, or uses. Throughout this specification, like reference numerals will be used to refer to like elements.

FIG. 1 schematically illustrates in section a double-flow turbojet engine including a nacelle 6 acting as an external envelope surrounding the various parts, a rotor 2 rotating about the machine's axis X-X' and a fan 4 carried by the rotor 2.

In the following description, the terms "upstream" and "downstream" refer to axial positions along the axis X-X' in the direction of the airflow through the jet engine. The term "front" is equivalent to "upstream" and "rear" to "downstream".

The terms "inner" or "inside", and "outer" or "outside", refer to radial positions relative to the axis X-X' of the turbine, "outer" or "outside" meaning a position further from the axis in question and "inner" or "inside" meaning a position closer to the axis.

Downstream of the fan 4, the airflow is separated by the splitter nose 10, also referred to as the flow separator, into a primary and a secondary airflow. The primary airflow passes through an inner annular primary duct or primary flow path to enter the low-pressure compressor. The secondary airflow is deflected by the splitter nose 10 through an outer annular secondary duct or secondary flow path. The turbojet comprises a series of functional groups: the fan 4, the low pressure compressor 14, the high pressure compressor 16, the combustion chamber 18 and the turbine 20. Supporting arms 8 provide a mechanical connection between the nacelle and the central portion comprising the rotor and the different stages. The splitter nose includes a wall delimiting the inner or inside portion of the secondary flow path.

Figure 2:
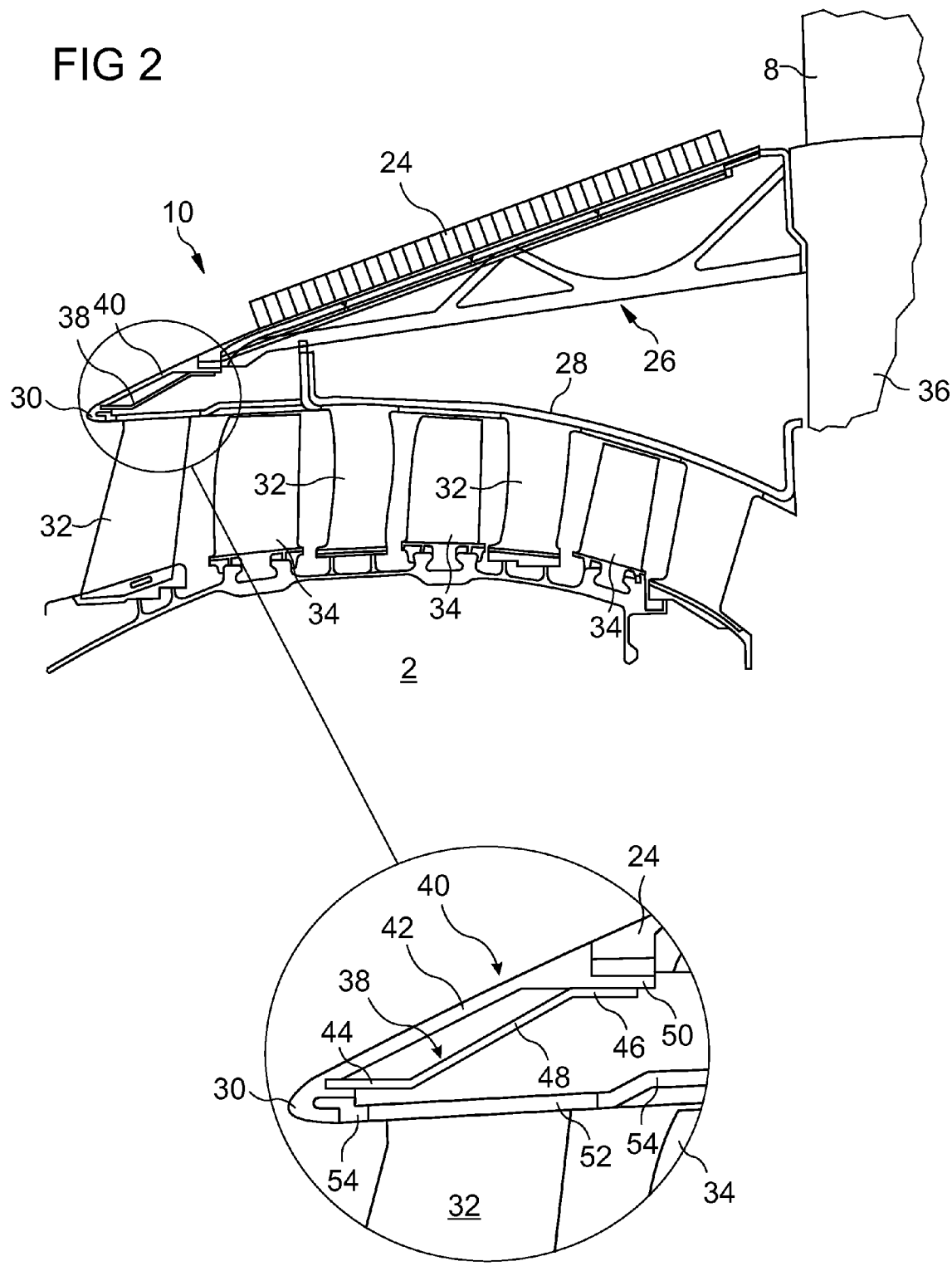
FIG. 2 is a sectional view of part 22 of the turbojet shown in FIG. 1, showing, among other things, the splitter nose or flow separator in accordance with the invention which comprises a wall equipped with air-oil heat exchangers.

FIG. 2 is a sectional view of the splitter nose 10 extending from leading edge 30 to the supporting arms 8 and additionally illustrating a corresponding portion of the low-pressure compressor 14. The splitter nose 10 ensures the separation of the airflow generated by the fan 4 between the primary flow path through the low pressure compressor 14 and the secondary flow path. The primary flow path is delimited by the envelope of the rotor 2 and the housing 28. The moving, or rotor, blades 34 are carried by the rotor 2 and the fixed, or stator, blades 32 are supported by the inner wall of the splitter nose 10 and the housing 28. The outer wall of the splitter nose 10 includes an air-oil surface heat exchanger 24, a support beam 26 and a shell 40 forming the leading edge 30 and the start of the inner wall delimiting the primary flow path. The support beam 26 is secured to the intermediate housing 36 which is itself rigidly attached to the nacelle by the supporting arms 8. The intermediate housing 36 is therefore a particularly strong and rigid part of the machine. The support beam 26 extends from the intermediate housing 36 to the shell 40. It is a generally triangulated structure supporting the heat exchanger 24. The heat exchanger 24 comprises a plate forming the splitter nose outer wall and provided with one or more oilways to be cooled. The plate is provided with cooling fins on its outer face. The heat exchanger 24 is generally curved so as to form an annular segment of the wall. Alternatively, it may comprise a series of facets generally flat or slightly curved and forming an angle relative to each other so as to form a generally curved shape.

Various mechanical or electrical components of a turbine must be lubricated and/or cooled, such as certain bearings, gearboxes and some electric machinery. To do this, a lubrication system is provided. The oil acts as a lubricant and also as a heat transfer fluid, whereby the accumulated heat needs to be removed via a heat exchanger.

In order to minimize aerodynamic interference, so-called surface heat exchangers were developed. They make use of a wall in contact with a flow of air in order to provide a heat exchange surface between the heat transfer fluid, such as the circulating lubricating oil, and the air (heat sink).

The shell 40 of the splitter nose 10 contains a metal blade 38 designed to de-ice the shell, especially its leading edge 30. The metal blade 38 forms a thermal bridge between the leading edge 30 and a heat source represented by the heat exchanger 24. The front end 44 of the metal blade 38 is inserted into a corresponding slot within the splitter nose 10, near the leading edge 30. The front part of a guide wall 54 for the primary flow is also inserted into a corresponding slot on the inside of the splitter nose 10. The guide wall 54 serves to support the first row of stator blades 32 where their platforms 52 are arranged and fixed by welding or by any other means on the guide wall 54. The rear end 46 of the metal blade 38 is fixed by mechanical clamping (not shown) at the rear end 50 to a guide wall 42 for the secondary flow. The metal blade 38 is held only by its front end 44 and rear end 46, free from contact with other parts of the nose 10 to ensure optimal thermal connection between the heat source and the leading edge 30. It has a longitudinal cross-section in an "S" shape, where its front end 44 and its rear end 46 are generally straight and are preferably parallel to each other. The central part 48 of the metal blade 38 also has a longitudinal section that is generally rectilinear. The metal blade 38 may exhibit a variety of forms, including particularly measures to avoid any obstacles present in the cavity of the shell 40 of the splitter nose 10. The "S" shape has the advantage of being able to distort in order to compensate for expansions engendered by temperature variations. This form is particularly simple to implement, both in terms of manufacture and installation. The connection of the front end 44 of the blade 38 by insertion in a corresponding slot of the inner face of the leading edge 30 also contributes to the simplicity of assembly as well as compensating for any expansion of the blade 38 with respect to the shell 40.

FIG. 3 shows a first embodiment of the splitter nose 10, or flow separator, described above. The heat source 24 is shown schematically. It can, just as the separator in FIG. 2, include a heat exchanger, e.g., heat exchanger 24, especially a surface type, such as an air cooled oil cooler (ACOC). The metal blade 38 has a profile different from that of FIG. 2. Its central portion 48, although generally straight as in the previous one, is in contact over its whole length with the platform 52 of a blade 32 of the first row of stator blades 32. This contact, as well as providing a heat flow to the leading edge 30, provides a heat flow to the first row of stator blades 32, especially towards their platforms 52. The contact between the blade 38 and the platform 52 may be a simple free contact or via one or more thermal bridges made between the blade 38 and the platforms 52. It should be noted that the blade 38, depending on its circumferential width around the splitter nose 10, can span multiple adjacent platforms (circumferentially). The guide wall 54 may also have connecting areas between the platforms (not shown in the figure), so that the blade 38 can also cover and be in contact with one or more of these areas.

FIG. 4 shows a second embodiment of the splitter nose 10, or flow separator, described in FIG. 2. Just as for the first embodiment described above, the heat source 24 is shown schematically. Just as in the splitter nose 10 shown in FIG. 2 it, too, can include a heat exchanger, especially a surface type, especially an air cooled oil cooler (ACOC). The blade 38 is here in one piece with the leading edge 30 and its generally rectilinear central part 48 extends parallel to the wall 42. This wall 42 is also supported by the metal blade 38 via a layer of insulating material 56. In this way, heat from the heat source 24 is directed to the leading edge 30. The wall 42 protects the insulation 56 and the insulation 56 ensures optimal conduction of heat energy from the heat source 24 to the front of the splitter nose 10.

Figure 5:
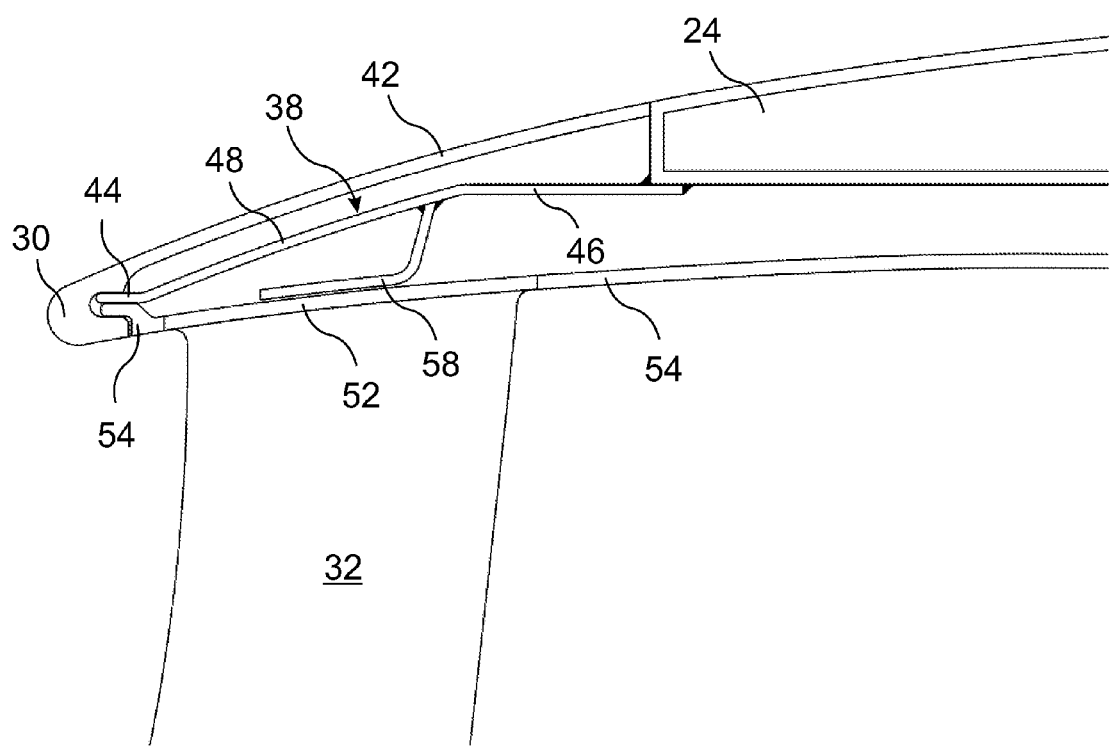
FIG. 5 is a sectional view of a third embodiment of the flow separator of FIG. 2, in accordance with the invention.

FIG. 5 shows a third embodiment of the splitter nose 10, or flow separator, described in FIG. 2. Just as for the first and second embodiments described above, the heat source 24 is shown schematically. Just as in the splitter nose 10 shown in FIG. 2 it, too, can include a heat exchanger, especially a surface type, especially an air cooled oil cooler (ACOC). The blade 38 has a connection or foot 58 from its central part 48 to elements of the front part of the primary flow guide wall 54, such as the platforms 52 of the first row of stator blades 32. In order to direct heat to several points on the shell 40, it is possible to provide one or more links from the front end 44 or the central part 48 of the blade 38 towards these points. The shape of the blade 38 in this configuration is particularly interesting as far as transmitting heat for de-icing, because it gives the nose's designer considerable freedom especially for the shell 40 forming the front part of the splitter nose 10.

Generally, the blade 38 should be made of a good metallic conductor such as aluminium. The shell 40 is typically made of aluminium. Since, in principle, the sole function of the blade 38 is to provide a thermal bridge, it can be made using aluminium of a different grade from that of the shell 40, which itself is subjected to greater stresses. The blade 38 is preferably bent to shape. Its central section 48 may have an insulating coating to reduce heat loss in the cavity of the shell 40 through convection and radiation.

Referring to FIG. 2, and applying equally to FIGS. 3, 4 and 5, the wall 42 defining the secondary airflow has a rear end 50 with a shoulder for supporting the front edge of the heat exchanger heat 24. Although not illustrated in detail, the joint may be as follows: the front end of the heat exchanger 24, the rear end 50 of the wall 42 and the rear end 46 of the blade 38 constitute a stack and include one or more holes drilled in a direction generally radially with respect to the rotor, for receiving a means of fixing such as a bolt to ensure this stack is held together under pressure. The rear end 46 of the blade 38 may include a means for retaining a nut so that fixing of the shell 40, blade 38 and heat exchanger 24 assembly could be achieved by inserting a clamping screw from the secondary airstream channel.

It should be noted that the blade 38 has preferentially a generally circular cross-section matching the corresponding section of the shell 40. The blade 38 can form a complete closed or open circle. It may also consist of a series of arcuate sections which are contiguous or separate from each other. Depending on various parameters, it may not be necessary for the thermal bridge formed by the blade 38 to be continuous over the entire circumference of the sleeve.

It should also be noted that the heat source can be other than a heat exchanger. For instance, the rear end 46 of the blade 38 might be in contact with, for example, an oil pipe in the turbine's lubrication system.

It should also be noted that the blade 38 can extend backwards beyond the rear end of the wall 42 of the shell 40. Indeed, it may be that access to the heat source may not be possible directly at the point where the shell 40 joins the back of the splitter nose 10 (when there is no exchanger at this point) but only much further back. In this case, the blade 38 will be of such a length as to form a protrusion. In this event, it need not be attached to the wall 42 as it may be desirable for it to provide a thermal bridge exclusively to the front end of the shell 40 or its leading edge 30.

It is also worth noting that the connection between the front end 44 of the blade 38 and the shell 40 need not necessarily be by free insertion or by sliding in a slot. Indeed, especially for reasons including thermal conduction and/or stability of assembly, it may be necessary to provide a certain degree of clamping or additional fixing using a bolt, especially from the outer wall delimiting the secondary airstream or the inner wall delimiting the primary airstream. The joint to the front end 44 of the blade 38 may also be made using a bolt alone, as described above. In any event, even if the front end 44 of the blade 38 is fixed to the shell 40 without any possibility of movement, its "S" shape will compensate for differential thermal expansion between the blade 38 and the shell 40.

It is also worth noting that the above descriptions of the embodiments of the invention, which were made pursuant to an axial turbomachine, can also be applied to other applications where a main flow is separated into a first and a second flow. In this case, the first flow corresponds to the primary flow in a double-flow axial turbomachine and the second flow corresponds to the secondary flow of the said machine.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A gas flow separator for splitting a gas flow into a first flow and a second flow, said separator comprising:
   a separator leading edge; and
   a leading edge de-icing device comprising at least a metal blade in thermal contact with the leading edge and extending from the leading edge to a rear end of the separator at some distance from leading edge where the metal blade is in thermal contact with a heat source located at some distance from the leading edge.

2. The separator in accordance with claim 1, wherein the contact between the metal blade and the leading edge is provided by insertion of the blade into a slot disposed within the separator and close to the leading edge.

3. The separator in accordance with claim 1, wherein the separator comprises a guide wall of the first flow and a guide wall of the second flow, and the metal blade is in thermal contact with the guide wall of the first flow and the guide wall of the second flow.

4. The separator in accordance with claim 3, wherein the metal blade is held in place by attaching a rear end of the metal blade to the guide wall of the second flow.

5. The separator in accordance with claim 3, wherein the metal blade extends mainly along the guide wall of the second flow, having an insulating material placed between the guide wall of the second flow and the metal blade.

6. The separator in accordance with claim 5, wherein the metal blade is made of a single piece with the leading edge and the guide wall of the second flow is fixed to the blade by the insulating material.

7. The separator in accordance with claim 1, wherein the metal blade has a longitudinal cross-section generally in the shape of an "S", having a substantially straight front end and a substantially straight rear end.

8. The separator in accordance with claim 1 wherein the separator comprises a splitter nose for dividing a gas flow in a dual rotor axial turbomachine, the first flow being the primary flow and the second flow being the secondary flow of the dual rotor turbomachine.

9. The separator in accordance with claim 8, wherein the splitter nose comprises a guide wall of the secondary flow, and the metal blade is in contact with a rear end of the guide wall of the secondary flow.

10. The separator in accordance with claim 9 further comprising a surface heat exchanger surface in the extension of the guide wall of the secondary flow and the metal blade is in thermal contact with the heat exchanger.

11. The separator in accordance with claim 10 wherein the rear end of the guide wall for secondary flow, a front end of the heat exchanger, and a rear end of the blade form a stacked assembly.

12. The separator in accordance with claim 11, wherein the metal blade comprises at least one female threaded member intended to mate with a bolt passing through the stacked assembly.

13. The separator in accordance with claim 12 wherein the metal blade has an approximately circular cross-section.

14. The separator in accordance with claim 12 wherein the de-icing device comprises a plurality of blades each having an approximately arcuate cross-section.

15. The compressor in accordance with claim 14, wherein the metal blade is in thermal contact with a heat source located at some distance from the leading edge.

16. A dual rotor axial turbomachine compressor comprising a separator for separating an air flow into a primary and a secondary stream, the separator comprising:
   a separator leading edge; and
   a leading edge de-icing device comprising at least a metal blade in thermal contact with the leading edge and extending from the leading edge to a rear end of the separator at some distance from leading edge where the metal blade is in thermal contact with a heat source located at some distance from the leading edge.

* * * * *